(12) United States Patent
Toyoda et al.

(10) Patent No.: US 9,695,087 B2
(45) Date of Patent: Jul. 4, 2017

(54) SIALON SINTERED BODY AND CUTTING INSERT

(71) Applicant: NGK SPARK PLUG CO., LTD., Nagoya-shi, Aichi (JP)

(72) Inventors: Ryoji Toyoda, Kakamigahara (JP); Fumihiro Kikkawa, Inazawa (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 339 days.

(21) Appl. No.: 14/389,436

(22) PCT Filed: Dec. 27, 2013

(86) PCT No.: PCT/JP2013/085085
§ 371 (c)(1),
(2) Date: Sep. 30, 2014

(87) PCT Pub. No.: WO2015/097856
PCT Pub. Date: Jul. 2, 2015

(65) Prior Publication Data
US 2016/0207837 A1 Jul. 21, 2016

(51) Int. Cl.
| C04B 35/597 | (2006.01) |
| B24D 18/00 | (2006.01) |
| C04B 35/587 | (2006.01) |
| C04B 35/591 | (2006.01) |

(52) U.S. Cl.
CPC ........ *C04B 35/597* (2013.01); *B24D 18/0009* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3865* (2013.01); *C04B 2235/3873* (2013.01); *C04B 2235/767* (2013.01); *C04B 2235/80* (2013.01); *C04B 2235/85* (2013.01)

(58) Field of Classification Search
CPC ...... C04B 35/597; C04B 35/587; C01B 33/26
See application file for complete search history.

(56) References Cited

U.S. PATENT DOCUMENTS

| 4,818,635 A | 4/1989 | Ekstrom et al. |
| 5,631,200 A | 5/1997 | Ukegawa et al. |
| 7,629,281 B2 | 12/2009 | Osthols |
| 2006/0178256 A1 | 8/2006 | Yeckley |
| 2008/0167174 A1 | 7/2008 | Osthols |
| 2012/0066981 A1 | 3/2012 | Nakayama et al. |

FOREIGN PATENT DOCUMENTS

| CN | 102659414 A | 9/2012 |
| JP | 59-232972 A | 12/1984 |
| JP | 60-239365 A | 11/1985 |
| JP | 62-119165 A | 5/1987 |
| JP | 2008-162882 A | 7/2008 |
| JP | 2008-529948 A | 8/2008 |
| JP | 2013-224240 A | 10/2013 |
| KR | 0177893 B1 | 3/1999 |
| KR | 1020110139212 A | 12/2011 |
| WO | 2010/103839 A1 | 9/2010 |

OTHER PUBLICATIONS

Office Action issued Sep. 18, 2015 by the Korean Intellectual Property Office in counterpart Korean Application No. 10-2014-7027635.
Office Action issued on Feb. 2, 2016, by the State Intellectual Property Office of P.R. China in counterpart Chinese Application No. 201380018267.7.
International Search Report dated Feb. 4, 2014 issued in International Application No. PCT/JP2013/085085 (PCT/ISA/210).
Written Opinion dated Feb. 4, 2014 issued in International Application No. PCT/JP2013/085085 (PCT/ISA/37).
Office Action dated Jun. 20, 2014 issued by the Japanese Patent Office in corresponding Application No. 2014-513604.
Per-Olof Olsson et al., "Sinterability and Microstructure of La-Containing Sialon Materials", Structural Ceramics—Processing, Microstructure and Properties 11th RISO International Symposium on Metallurgy and Materials Science, 1990,12 pgs. total.
Per-Olof Olsson et al., "Hip-sintered β-and mixed a-βsialons densified with Y2O3 and La2O3 additions", Journal of Materials Science, 1990, vol. 25, No. 3, 11 pgs. total.
Jiuxin Jiang et al., "Self-Propagating High-Temperature Synthesis of a-SiAlon Doped by Re (Re=Eu, Pr, Ce) and Codoped by Re and Yttrium", Journal of the American Ceramic Society, 2004, vol. 87, No. 4, 5 pgs. total.
Jiu-Xin Jiang et al., "Effect of ratios of Y/Ce on phase assemblages of SHS-ed (Ce, Y) a-sialon powders and bulk materials", Materials Letters, 2004, vol. 58, No. 26, 5 pgs. total.

*Primary Examiner* — Pegah Parvini
(74) *Attorney, Agent, or Firm* — Sughrue Mion, PLLC

(57) ABSTRACT

A sialon sintered body includes a β-sialon ($Si_{6-Z}Al_ZO_ZN_{8-Z}$) and at least one polytype sialon, wherein a Z value is 0.4 or greater and 1.0 or less, a proportion of a total of peak intensities of each polytype sialon to a total of peak intensities of each sialon, is 10% or greater and 50% or less, at least one rare earth element B selected from a group consisting of La and Ce and at least one rare earth element C selected from a group consisting of Y, Nd, Sm, Eu, Gd, Dy, Er, Yb, and Lu is included, a molar ratio of the rare earth element B and the rare earth element C is 1.0:0.06 to 1.0:3.5 in terms of an oxide, and a total content of the rare earth elements B and C is 0.8 mol % or greater and 4.0 mol % or less in terms of an oxide.

5 Claims, 1 Drawing Sheet

SIALON SINTERED BODY AND CUTTING INSERT

TECHNICAL FIELD

The present invention relates to a sialon sintered body and a cutting insert.

BACKGROUND ART

A sialon sintered body is recognized as a material that has excellent hardness, has high strength in a temperature range of room temperature to a high temperature, and has high chemical stability than silicon nitride. Therefore, a wide range of applications of the sialon sintered body, such as a machine part, a heat resistant part, and a wear resistant part, is expected. One of the applications of the sialon sintered body is a cutting insert that is attached to a cutting tool (for example, refer to Patent Literatures 1 to 5). The cutting insert is a cutting edge detachably attached to the tip end of a main body of the cutting tool and is a tool part that is also referred to as a throw-away tip, a cutting edge replaceable tip or the like.

CITATION LIST

Patent Literature

Patent Literature 1: JP-A-2008-162882
Patent Literature 2: JP-A-2013-224240
Patent Literature 3: WO 2010/103839 A1
Patent Literature 4: JP-A-S60-239365
Patent Literature 5: JP-T-2008-529948

SUMMARY OF INVENTION

Technical Problem

However, when a workpiece such as a heat resistant alloy or the like is cut by a cutting insert, generally, different types of cutting inserts are used in roughing and semi-finishing. In roughing, a cutting insert made of a material in which strength and toughness are excellent, that is, breakage resistance is excellent, is often used. In semi-finishing, a cutting insert made of a material in which VB wear, boundary wear and the like are less likely to occur, that is, wear resistance is excellent, is often used.

As described above, generally, cutting inserts having different properties are used properly depending on working stages. However, the proper use of the cutting inserts is a burden to an operator. If the same cutting insert can be used in processes from roughing to semi-finishing, there is no need to change a cutting tool in the middle of cutting, which leads to reduction in time and simplification of operation. Also, a risk of using a wrong tool is reduced.

An object of the present invention is to provide a sialon sintered body and a cutting insert, having breakage resistance, VB wear resistance and boundary wear resistance.

Means for Solving Problem

A means for solving the problem is,

[1] a sialon sintered body comprising:
a β-sialon; and
at least one polytype sialon selected from a group consisting of a 12H-sialon, a 15R-sialon, and a 21R-sialon,
characterized in that:
a Z value of the β-sialon expressed by $Si_{6-Z}Al_ZO_ZN_{8-Z}$ is 0.4 or greater and 1.0 or less,
a proportion $[(I_P/I_A)\times 100]$ of a total $I_P$ of peak intensities of each polytype sialon calculated from the peak intensities of the polytype sialons to a total $I_A$ of peak intensities of each sialon calculated from the peak intensities of the sialons, which is obtained by X-ray diffraction analysis, is 10% or greater and 50% or less,
the sialon sintered body includes at least one rare earth element B selected from a group consisting of La and Ce, and at least one rare earth element C selected from a group consisting of Y, Nd, Sm, Eu, Gd, Dy, Er, Yb, and Lu,
a molar ratio $M_B:M_C$ of the rare earth element B and the rare earth element C is 1.0:0.06 to 1.0:3.5 in terms of an oxide, and
a total content of the rare earth element B and the rare earth element C in the sialon sintered body is 0.8 mol % or greater and 4.0 mol % or less in terms of an oxide.
Preferable aspects of [1] are as follows:
[2] The sialon sintered body according to [1], characterized in that:
when the Z value calculated from a composition of the sialon sintered body is set to a theoretical Z value on the assumption that an amount of Al included in the β-sialon is the same as the amount of Al included in the sialon sintered body, a solid solution ratio of Al in the β-sialon, which is expressed by a proportion [(Z value/theoretical Z value)×100] of the Z value to the theoretical Z value, is 30% or greater and 60% or less.
[3] The sialon sintered body according to [1] or [2], characterized in that:
the sialon sintered body does not include an α-sialon.
[4] The sialon sintered body according to [1] or [2], characterized in that:
a proportion $[(I_\alpha/I_A)\times 100]$ of a peak intensity $I_\alpha$ of an α-sialon to the total $I_A$ of the peak intensities of each sialon, which is obtained by X-ray diffraction analysis, is less than 10%,
in the α-sialon expressed by $M_x(Si,Al)_{12}(O,N)_{16}$ (0<x≤2), M is a metal element including the rare earth element B and the rare earth element C, and
a proportion $[(A_\alpha/A_S)\times 100]$ of an atomic ratio $A_\alpha$ of the rare earth element B to the rare earth element C in the α-sialon to an atomic ratio $A_S$ of the rare earth element B to the rare earth element C in the sialon sintered body is 70% or less.
[5] A cutting insert comprising:
the sialon sintered body according to any one of [1] to [4].

Advantageous Effects of Invention

The sialon sintered body according to the present invention has breakage resistance, VB wear resistance and boundary wear resistance. In addition, since the cutting insert according to the present invention is made of the sialon sintered body having breakage resistance, VB wear resistance and boundary wear resistance, it is possible to exhibit sufficient cutting performance in both roughing and semi-finishing over a long period of time at the time of cutting a workpiece such as a heat resistant alloy. Therefore, according to the present invention, it is possible to provide the cutting insert with a long life that can be used in both roughing and semi-finishing at the time of cutting a workpiece such as a heat resistant alloy.

DESCRIPTION OF EMBODIMENTS

Figure 1:
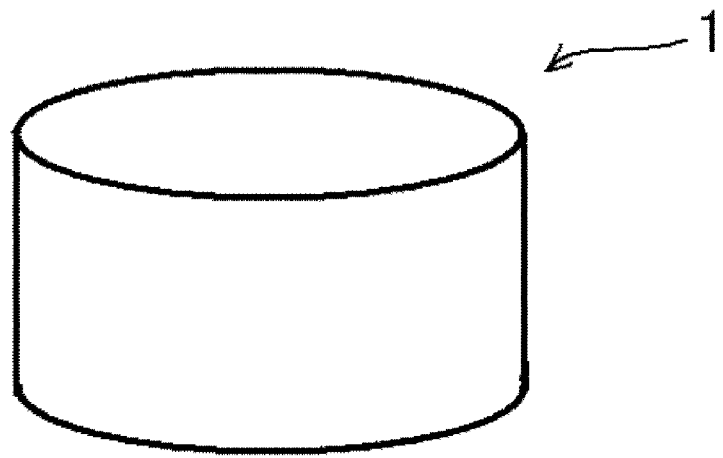
FIG. 1 is a schematic illustration diagram illustrating an embodiment of a cutting insert according to the present invention.

A sialon sintered body of the present invention includes a β-sialon, and at least one polytype sialon selected from a group consisting of a 12H-sialon, a 15R-sialon, and a 21R-sialon.

The β-sialon generally has a needle shape. Thus, when a large amount of the β-sialon is present in the sialon sintered body, a structure in which needle-like crystal grains are entangled with each other in a complicated manner is formed, and the progress of fracture of the sialon sintered body caused by external stress is suppressed. That is, the higher the ratio of the β-sialon in the sialon sintered body is, the more the breakage resistance of the sialon sintered body is improved.

All the 12H-sialon, the 15R-sialon, and the 21R-sialon are generally formed in a columnar shape. Thus, since the structure in which needle-like crystal grains are entangled with each other in a complicated manner is not formed as in the β-sialon, an effect on breakage resistance is low compared to the β-sialon. On the other hand, all the polytype sialons have excellent chemical reaction resistance with a workpiece such as a heat resistant alloy, and thus, the workpiece is hardly welded or spread. Accordingly, when the polytype sialon is included in the sialon sintered body, VB wear resistance is improved. Since the 12H-sialon, the 15R-sialon and the 21R-sialon have the same properties, the sialon sintered body only has to include at least one polytype sialon among the polytype sialons. Among the polytype sialons, the 12H-sialon is preferable from the viewpoint of achieving a good balance between breakage resistance and wear resistance.

In the sialon sintered body of the present invention, a total of the β-sialon and the polytype sialon with respect to the sialon sintered body is preferably 70 area % or greater and 98 area % or less, and more preferably 85 area % or greater and 97 area % or less. When the β-sialon and the polytype sialon are included in the sialon sintered body at the above-described ratio, the properties of the β-sialon and the polytype sialon are likely to be reflected as the properties of the sialon sintered body. A phase in which the properties of the sialon sintered body are determined in this manner may be referred to as a primary phase. Thus, when the β-sialon and the polytype sialon are included in the sialon sintered body at the above-described ratio, a desired performance can be obtained. Therefore, for example, hard carbo-nitrides, such as SiC, TiN, TiCN, TiC, and WC, other than the above-described primary phase, may also be included. The β-sialon and the polytype sialon that are included in the sialon sintered body at the above ratio are present as a crystal grain which has a minor axis size of about submicrometers to several micrometers in the sialon sintered body and has an aspect ratio of about 1 to 20 in many cases. A grain boundary phase that is amorphous or partially crystalline is present between the crystal grains. The grain boundary phase is present as a liquid phase at the time of sintering the sialon sintered body and contributes to improving the sinterability of the sialon sintered body.

A total amount of the β-sialon and the polytype sialon with respect to the sialon sintered body can be obtained as follows. The sialon sintered body is cut at an arbitrary plane surface and the mirror-finished cut surface is photographed using a scanning electron microscope at a magnification of 2000 to 5000 times. The obtained microstructure image is subjected to image analysis and the β-sialon, the polytype sialon, and the phases other than the β-sialon and the polytype sialon are classified, and each area is measured. The total amount can be obtained by calculating an area ratio of the β-sialon and the polytype sialon with respect to the entire area of the image.

The sialon sintered body of the present invention not only includes the β-sialon and the polytype sialon, but contains a specific β-sialon and polytype sialon at a specific ratio as described below. Also, the sialon sintered body contains a specific rare earth element at a specific ratio. Thus, the sialon sintered body has breakage resistance, VB wear resistance, and boundary wear resistance. That is, when a workpiece such as a heat resistant alloy is cut using the sialon sintered body as a cutting insert, the sialon sintered body of the present invention can exhibit sufficient cutting performance in both roughing and semi-finishing over a long period of time. Here, the VB wear resistance is a property against wear deterioration which is mainly caused by chemical factors, and the boundary wear resistance is a property against wear deterioration which is mainly caused by physical factors.

The β-sialon is expressed by a formula $Si_{6-Z}Al_ZO_ZN_{8-Z}$ and the value of Z thereof is preferably 0.4 or greater and 1.0 or less, and more preferably 0.6 or greater and 0.9 or less. Since at least the Z value is 0.4 or greater and 1.0 or less, and preferably 0.6 or greater and 0.9 or less, it is possible to provide a sialon sintered body having all of the breakage resistance, the VB wear resistance, and the boundary wear resistance. As the Z value increases, that is, as the amount of Al solid-solved in the β-sialon increases, the chemical reaction with a workpiece such as a heat resistant alloy is less likely to occur. As a result, the chemical wear of the sialon sintered body is prevented and VB wear resistance is improved. On the other hand, by solid-solving Al in the β-sialon, an ion bonding property is increased and a bonding distance between atoms is increased. Therefore, as the amount of Al solid-solved in the β-sialon increases, the grains of the β-sialon become vulnerable and breakage resistance is decreased. In addition, as the amount of Al solid-solved in the β-sialon increases, the shape of the β-sialon is changed from a needle shape to a columnar shape to decrease the aspect ratio. As a result, the structure in which needle-like crystal grains are entangled with each other in a complicated manner is hardly formed and breakage resistance is decreased. Accordingly, when the sialon sintered body is used as a cutting insert at the Z value greater than 1.0, the breakage resistance required for roughing of the heat resistant alloy cannot be obtained. When the sialon sintered body is used as a cutting insert at the Z value less than 0.4, the reactivity with the workpiece such as a heat resistant alloy is increased and VB wear resistance is decreased. Therefore, when the Z value is less than 0.4, the VB wear resistance required for semi-finishing cannot be obtained.

The Z value (Z) can be obtained as follows. The Z value can be obtained by the following Equation (1) by measuring the lattice constant of the a axis of the β-sialon at a depth of 1 mm or greater from the sintered surface of the sialon sintered body through X-ray diffraction analysis and using the measured value a and the lattice constant of the a axis of a n-silicon nitride (7.60442 angstroms).

$$Z=(a-7.60442)/0.0297 \qquad (1)$$

In the sialon sintered body of the present invention, a proportion $[(I_P/I_A)\times 100]$ of a total $I_P$ of the peak intensities of each polytype sialon calculated from the peak intensities of the polytype sialons to a total $I_A$ of the peak intensities of each sialon calculated from the peak intensities of the sialons, which is obtained by X-ray diffraction analysis, is 10% or greater and 50% or less, preferably 10% or greater and 40% or less, and more preferably 10% or greater and 30% or less. At least, the proportion [($I_P/I_A$)×100] is 10% or greater and 50% or less, preferably 10% or greater and 40% or less, and more preferably 10% or greater and 30% or less, and thus, it is possible to provide a sialon sintered body having all of breakage resistance, VB wear resistance, and boundary wear resistance. The proportion [($I_P/I_A$)×100] is an index indicating the content ratio of the polytype sialon in the sialon sintered body. When the proportion [($I_P/I_A$)×100] is less than 10%, the content ratio of the polytype sialon in the sialon sintered body is small, and thus, the effect of the polytype sialon improving VB wear resistance cannot be sufficiently obtained. As a result, the VB wear resistance of the sialon sintered body is deteriorated. When the proportion [($I_P/I_A$)×100] is greater than 50%, the content ratio of the polytype sialons in the sialon sintered body is large, and thus, the content ratio of the β-sialon is relatively small. Therefore, the structure in which needle-like crystal grains are entangled with each other in a complicated manner is hardly formed and breakage resistance of the sialon sintered body is deteriorated.

The proportion [($I_P/I_A$)×100] can be obtained as follows. First, a sample of the sialon sintered body is subjected to X-ray diffraction (XRD) analysis. For the peak intensities of each sialon obtained by X-ray diffraction analysis, the peak heights at the following 2θ values are used. While the maximum peak shown in the JCPDS card is used as a peak intensity of each sialon shown below, excluding 21R-sialon, a peak other than the maximum peak shown in the JCPDS card is used as a peak intensity of 21R-sialon. Thus, a value obtained by multiplying the peak intensity that is obtained by X-ray diffraction analysis by 2.5 is set to a peak intensity $I_{21R}$ of 21R-sialon, which the peak intensity $I_{21R}$ is used for calculation, so as to compare the peak with the peak heights of the peak intensities of other sialons. When the peak intensities of different types of sialons from each sialon shown below are identified, the X-ray diffraction charts and the JCPDS cards are compared with each other and a peak which is less affected by the peaks derived from other sialons is selected. When the selected peak is not the maximum peak, the peak is multiplied by an appropriate number to obtain a peak intensity $I_x$.

Peak intensity $I_β$ of the β-sialon: peak height at 2θ=about 33.4° (peak height in a (1,0,1) plane of the β-sialon)

Peak intensity $I_α$ of the α-sialon: peak height at 2θ=about 30.8° (peak height in a (2,0,1) plane of the α-sialon)

Peak intensity $I_{12H}$ of the 12H-sialon (formula: $SiAl_5O_2N_5$): peak height at 2θ=about 32.8° (peak height in a (0,0,12) plane of the 12H-sialon)

Peak intensity $I_{15R}$ of the 15R-sialon (formula: $SiAl_4O_2N_4$): peak height at 2θ=about 32.0° (peak height in a (0,0,15) plane of 15R-sialon)

Peak intensity $I_{21R}$ of the 21R-sialon (formula: $SiAl_6O_2N_6$): peak height at 2θ=about 37.6°×2.5 (peak height in a (1,0,10) plane of 21R-sialon×2.5)

The proportion [($I_P/I_A$)×100] can be obtained from the calculated value obtained by calculating the total $I_A$ of the peak intensities of each sialon (=$I_β+I_α+I_{12H}+I_{15R}+I_{21R}+I_x$) and the total $I_P$ of the peak intensities of polytype sialons (=$I_{12H}+I_{15R}+I_{21R}$) obtained by X-ray diffraction analysis as described above.

The sialon sintered body of the present invention includes at least one rare earth element B selected from a group consisting of La and Ce, and at least one rare earth element C selected from a group consisting of Y, Nd, Sm, Eu, Gd, Dy, Er, Yb, and Lu. When the rare earth element B and the rare earth element C are included in the sialon sintered body, generally, the rare earth element B and the rare earth element C are included in the raw material powder of the sialon sintered body. When only the rare earth element C is included in the raw material powder of the sialon sintered body and the sialon sintered body is produced under the condition of forming the β-sialon having a Z value of 0.4 or greater and 1.0 or less, an α-sialon is likely to be formed. That is, when the sialon sintered body is sintered, only the rare earth element C is included in the raw material powder and the rare earth element B is not included in the powder, a sialon sintered body in which the β-sialon and the polytype sialon are present as a primary phase cannot be obtained. However, the inventors have found that it is possible to suppress formation of the α-sialon and to form the polytype sialon by containing both the rare earth element B and the rare earth element C as the raw material powder when the sialon sintered body is sintered. It is preferable that the sialon sintered body include La in the rare earth elements B. La is more likely to form a needle-like β-sialon than Ce and to form a structure in which needle-like crystal grains are entangled with each other in a complicated manner. It is preferable that the sialon sintered body include at least one selected from a group consisting of Y, Dy, and Er among the rare earth elements C. By adding a small amount of these rare earth elements C, sinterability can be improved.

The molar ratio $M_B:M_C$ of the rare earth element B and the rare earth element C in the sialon sintered body of the present invention is 1.0:0.06 to 1.0:3.5, and preferably 1.0:0.1 to 1.0:3.0, in terms of an oxide. In other words, the molar ratio $M_C/M_B$ of the rare earth element B and the rare earth element C is 0.06 or greater and 3.5 or less, and more preferably 0.1 or greater and 3.0 or less. When the molar ratio $M_B:M_C$ is 1.0:0.06 to 1.0:3.5, and preferably 1.0:0.1 to 1.0:3.0, in terms of an oxide, the β-sialon and the polytype sialon are likely to be formed at a desired content ratio at the time of sintering and a sialon sintered body having excellent breakage resistance, VB wear resistance, and boundary wear resistance can be provided. When the molar ratio $M_C/M_B$ is less than 0.06, the sinterability is decreased and a dense sialon sintered body is hardly obtained. Further, even when it is sintered, the polytype sialon is likely to be formed and the formed sialon sintered body has deteriorated breakage resistance. When the molar ratio $M_C/M_B$ is greater than 3.5, the α-sialon is likely to be formed and the polytype sialon is hardly formed at the time of sintering. As a result, a sialon sintered body in which the β-sialon and the polytype sialon are present as a primary phase cannot be obtained and VB wear resistance is deteriorated. Even when the polytype sialon is formed, the molar ratio $M_C/M_B$ is greater than 3.5, and a crystal having a garnet type crystal structure in the grain boundary phase is likely to be precipitated. Therefore, the formed sialon sintered body is likely to become brittle and when the sialon sintered body is used as a cutting insert, breakage resistance and boundary wear resistance are deteriorated and the life is reduced.

A total content of the rare earth element B and the rare earth element C in the sialon sintered body is 0.8 mol % or greater and 4.0 mol % or less, and preferably 1.0 mol % or greater and 3.0 mol % or less in terms of an oxide. When the content is 0.8 mol % or greater and 4.0 mol % or less, and preferably 1.0 mol % or greater and 3.0 mol % or less in terms of an oxide, the β-sialon and the polytype sialon are likely to be formed at a desired content ratio at the time of sintering. As a result, it is possible to provide a dense sialon sintered body having excellent breakage resistance, VB wear resistance, and boundary wear resistance. When the content is less than 0.8 mol % in terms of an oxide, the sinterability is decreased and a dense sialon sintered body is hardly obtained. Further, even when the sialon sintered body is sintered, a structure in which the β-sialon is less likely to have a needle shape and in which needle-like crystal grains are entangled with each other in a complicated manner is hardly obtained. Thus, the formed sialon sintered body has deteriorated breakage resistance. When the content is greater than 4.0 mol % in terms of an oxide, the grain boundary phase is likely to be segregated. As a result, the strength of the sialon sintered body is decreased. In addition, when the content is greater than 4.0 mol % in terms of an oxide, a large amount of the rare earth elements B and C which are not solid-solved in sialon remains in the grain boundary phase and thus, a large number of soft grain boundary phases are formed. Therefore, the formed sialon sintered body has deteriorated boundary wear resistance.

The solid solution ratio of Al in the β-sialon is preferably 30% or greater and 60% or less. When the solid solution ratio of Al in the β-sialon is 30% or greater and 60% or less, a balance between the solid solution ratio of Al in the β-sialon and the solid solution ratio of Al in polytype sialon and in the grain boundary phase is good. That is, when the solid solution ratio of Al in the β-sialon is less than 30%, the amount of the grain boundary phase is increased and the density of Al in the grain boundary phase is increased. As a result, there is a concern that heat resistance may be decreased. In addition, when the solid solution ratio of Al in the β-sialon is less than 30%, a crystal having a garnet type crystal structure in the grain boundary phase is likely to be precipitated, which causes the sialon sintered body to become brittle. Thus, there is a concern that breakage resistance and boundary wear resistance may be decreased. When the solid solution ratio of Al is greater than 60%, the amount of the grain boundary phase is reduced and the density of Al in the grain boundary phase is decreased. As a result, there is a concern that grain separation is likely to occur and the VB wear resistance and the boundary wear resistance of the sialon sintered body may be decreased.

When the Z value calculated from the composition of the sialon sintered body on the assumption that the amount of Al included in the β-sialon is the same as the amount of Al included in the sialon sintered body is set to a theoretical Z value, the solid solution ratio of Al in the β-sialon is expressed by a proportion [(Z value/theoretical Z value)×100] of the Z value to the theoretical Z value. The proportion [(Z value/theoretical Z value)×100] can be obtained as follows. The sialon sintered body is subjected to X-ray diffraction analysis and the Z value (Z) is obtained by the above-described Equation (1). The theoretical Z value (TZ) is obtained by the following Equation (2), by measuring the contents (mass %) of Si and Al included in the sialon sintered body by X-ray fluorescence analysis, chemical analysis, or the like, setting a value obtained by dividing the measured content of Si by the atomic weight of Si to MSi, and setting a value obtained by dividing the measured content of Al by the atomic weight of Al to MAl.

$$TZ = 6MAl/(MSi+MAl) \quad (2)$$

The proportion [(Z value/theoretical Z value)×100] is calculated from the obtained Z value and theoretical Z value.

It is preferable that the sialon sintered body of the present invention does not include the α-sialon. The α-sialon generally has a spherical shape. Thus, when the α-sialon is included in the sialon sintered body, the sialon sintered body becomes brittle and breakage resistance and boundary wear resistance are decreased. On the other hand, when the α-sialon is included in the sialon sintered body, the hardness is increased and thus, VB wear resistance is improved. When the sialon sintered body is used as a cutting insert only in semi-finishing, it is preferable that VB wear resistance is improved, and thus, it is preferable that the sialon sintered body contains the α-sialon. Meanwhile, when the sialon sintered body is generally used as a cutting insert in processes from roughing to semi-finishing, all breakage resistance, VB wear resistance, and boundary wear resistance have to be excellent, and thus, it is preferable that the sialon sintered body includes a small amount of the α-sialon, and it is more preferable that the sialon sintered body does not include the α-sialon.

When the sialon sintered body of the present invention includes the α-sialon, as long as the following conditions (1) to (3) are satisfied, it is possible to provide a sialon sintered body having the same level of breakage resistance, VB wear resistance, and boundary wear resistance as in a case where the α-sialon is not included. The conditions are as follows:

(1) the proportion [($I_\alpha/I_A$)×100] of the peak intensity $I_\alpha$ of the α-sialon to a total $I_A$ of the peak intensities of each sialon obtained when the sialon sintered body is subjected to X-ray diffraction analysis is less than 10%;

(2) in the α-sialon expressed by $M_x(Si,Al)_{12}(O,N)_{16}$ (0<x≤2), M is a metal element including the rare earth element B and the rare earth element C; and (3) a proportion [($A_\alpha/A_S$)×100] of an atomic ratio $A_\alpha$ of the rare earth element B to the rare earth element C in the α-sialon to an atomic ratio $A_S$ of the Rare Earth Element B to the rare earth element C in the sialon sintered body is 70% or less.

As the content of the α-sialon increases in the sialon sintered body, the sialon sintered body becomes more brittle and breakage resistance and boundary wear resistance are decreased. Accordingly, it is preferable that the content of the α-sialon in the sialon sintered body is small as described above. However, when the conditions (2) and (3) are satisfied, it is possible to maintain all performances of the breakage resistance, the VB wear resistance, and the boundary wear resistance of the sialon sintered body including the α-sialon in an amount in which the condition (1) is satisfied. It is known that the rare earth element B has a large ion radius and thus, does not penetrate and is not solid-solved into the α-sialon alone. However, by adding both of the rare earth element B and the rare earth element C into the raw material powder of the sialon sintered body, a site into which the rare earth element can penetrate is slightly widened when the rare earth element C penetrates and is solid-solved into the α-sialon, and thus, the rare earth element B can penetrate and be solid-solved into the α-sialon. In the α-sialon into which both the rare earth element B and the rare earth element C penetrate and are solid-solved, grain separation is less likely to occur compared to the α-sialon into which the rare earth element C penetrates and is solid-solved alone. The α-sialon into which both the rare earth element B and the rare earth element C penetrate and are solid-solved has excellent boundary wear resistance. Further, when the ratio $A_\alpha/A_S$ is 70% or less, that is, when the atomic ratio of the rare earth element B to the rare earth element C in the α-sialon is smaller than in the entire sialon sintered body and is 70% or less, and the penetration solid-solution ratio of the rare earth element B into the α-sialon is small, the interface bonding force between the grain boundary phase and the α-sialon is further increased.

As a result, grain separation is less likely to occur and thus, boundary wear resistance and breakage resistance are excellent.

An example of a method of producing the sialon sintered body of the present invention will be described below. A powder including elements that are the components of sialon, such as α-$Si_3N_4$ powder, $Al_2O_3$ powder, or MN powder, is mixed with at least one of $La_2O_3$ powder and $CeO_2$ powder as a powder of the oxide of the rare earth element B, and at least one of $Y_2O_3$ powder, $Nd_2O_3$ powder, $Sm_2O_3$ powder, $Eu_2O_3$ powder, $Gd_2O_3$ powder, $Dy_2O_3$ powder, $Er_2O_3$ powder, $Yb_2O_3$ powder, and $Lu_2O_3$ powder as a powder of the oxide of the rare earth element C. Thus a raw material powder is prepared. Instead of MN, 21R-sialon powder may be used. In addition, instead of an oxide, a hydroxide may be used. As the raw material powder, a powder having an average particle size of 5μ or smaller, preferably 3μ or smaller, and more preferably 1μ or smaller is preferably used. The mixing ratio of the raw material powders may be respectively determined in consideration of the composition of the sialon sintered body after sintering.

Next, the prepared raw material powders, an organic binder of microcrystalline wax dissolved in ethanol and ethanol are placed in a pot made of $Si_3N_4$, and all the ingredients are wet-mixed by using a ball made of $Si_3N_4$. The obtained slurry is sufficiently dried and press-molded into a desired shape. The obtained molded body is subjected to degreasing in a heating apparatus in a 1-atm nitrogen atmosphere at 400° C. to 800° C. for 60 to 120 minutes. The degreased molded body is placed in a $Si_3N_4$ vessel and is subjected to heat treatment in a nitrogen atmosphere at 1700° C. to 1900° C. for 120 to 360 minutes to obtain a sialon sintered body. When the theoretical density of the obtained sialon sintered body is less than 99%, the sialon sintered body is further subjected to HIP in a 1000-atm nitrogen atmosphere at 1500° C. to 1700° C. for 120 to 240 minutes to obtain a dense body having a theoretical density of 99% or greater.

Figure 2:
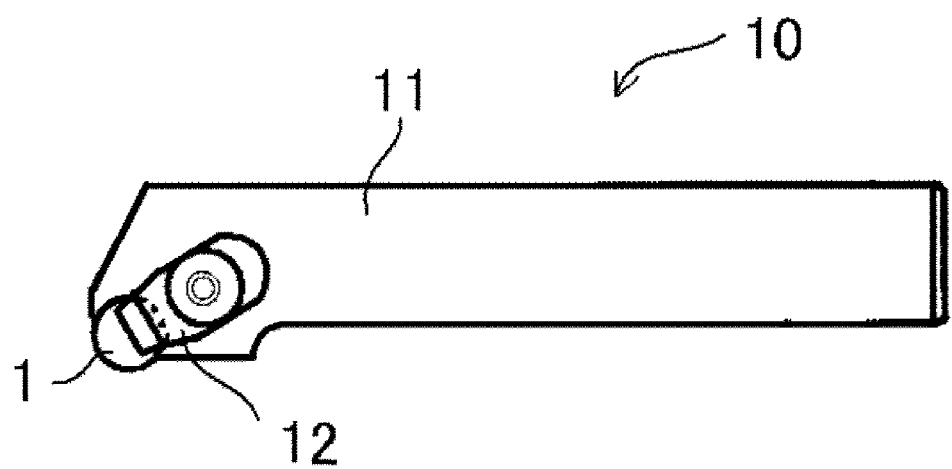
FIG. 2 is a schematic illustration diagram illustrating an embodiment of a cutting tool including the cutting insert shown in FIG. 1.

The sialon sintered body of the present invention can be used as a cutting insert. FIG. 1 is a schematic illustration diagram illustrating an embodiment of a cutting insert according to the present invention. FIG. 2 is a schematic illustration diagram illustrating an embodiment of a cutting tool including the cutting insert shown in FIG. 1. As shown in FIG. 1, a cutting insert 1 of the embodiment has a substantially cylindrical shape, and is attached to a cutting tool 10 to be used. The cutting tool 10 is used in cutting of a heat resistant alloy or the like and includes a mounting portion 12 at a tip end of a main body 11. The cutting insert 1 is detachably attached to the mounting portion 12.

The cutting insert 1 of the embodiment is made of the sialon sintered body of the present invention. Since the cutting insert 1 is made of the above-described sialon sintered body, the cutting insert has breakage resistance, VB wear resistance, and boundary wear resistance. That is, the cutting insert 1 has breakage resistance to resist roughing of a heat resistant alloy, VB wear resistance required to obtain a good working surface in semi-finishing, and boundary wear resistance to prevent fang-like wear that is likely to occur at a place at which a workpiece such as Waspaloy is cut and work hardened, and can be generally used in processes from roughing to semi-finishing. The cutting insert 1 is suitably used in cutting in which a heat resistant alloy, such as Inconel 718, including Ni as a main component, or a heat resistant alloy, such as Waspaloy, including Ni as a main component and 10 mass % or greater of Co, is used as a workpiece.

The cutting insert of the present invention may have another embodiment including the sialon sintered body, and a coating film provided on at least a part of the outer circumferential surface of the sialon sintered body and formed of various types of carboxynitrides represented as TiN, Ti(C,N), TiC, $Al_2O_3$, (Ti,Al)N, and (Ti,Si)N. When the coating film is provided at least a part of the cutting edge of the sialon sintered body in the cutting insert, the reactivity with the workpiece is reduced and the hardness is increased. Thus, the wear resistance of the coating film is further improved.

The sialon sintered body of the present invention is not limited to the cutting insert and can be used as another cutting tool, a machine part, a heat resistant part, a wear resistant part, or the like.

EXAMPLES

Preparation of Cutting Insert

A raw material powder was prepared by mixing α-$Si_3N_4$ powder, $Al_2O_3$ powder, and MN powder, having an average particle size of 1.0 μm or less, with a powder of the oxides of rare earth elements, having an average particle size of 1.0 μm or less, to have the composition shown in Table 1. Next, the mixed raw material powders, an organic binder of microcrystalline wax dissolved in ethanol, and ethanol were placed in a pot made of $Si_3N_4$, and all the ingredients were wet-mixed by using a ball made of $Si_3N_4$. The obtained slurry was sufficiently dried and press-molded into a shape of a cutting insert in conformity with RNGN120700T01020 of the ISO standards. The obtained molded body was subjected to degreasing with a heating apparatus in a 1-atm nitrogen atmosphere at about 600° C. for 60 minutes. The degreased molded body was further placed in a $Si_3N_4$ vessel and was subjected to heat treatment in a nitrogen atmosphere at a temperature of 1850° C. for 240 minutes to obtain a sialon sintered body. When the theoretical density of the obtained sialon sintered body is less than 99%, the sialon sintered body was further subjected to HIP in a 1000-atm nitrogen atmosphere at about 1600° C. for 180 minutes to obtain a dense body having a theoretical density of 99% or greater. The sialon sintered body was ground with a diamond wheel to a shape in conformity with RNGN120700T01020 of the ISO standards, and thus, a cutting insert for a cutting tool was obtained.

TABLE 1

| Test No. | Composition (mol %) | | | | | | | |
|---|---|---|---|---|---|---|---|---|
| | $Si_3N_4$ | $Al_2O_3$ | AlN | Rare earth oxide | | | | |
| 1 | 42.9 | 9.2 | 46.0 | $CeO_2$ | 1.1 | $Y_2O_3$ | 1.1 | |
| 2 | 44.0 | 12.5 | 40.9 | $La_2O_3$ | 1.3 | $Y_2O_3$ | 1.3 | |
| 3 | 44.8 | 12.7 | 41.6 | $La_2O_3$ | 0.45 | $Y_2O_3$ | 0.45 | |
| 4 | 44.0 | 12.5 | 40.9 | $La_2O_3$ | 0.7 | $CeO_2$ | 0.6 | $Y_2O_3$ | 1.3 |
| 5 | 43.5 | 12.3 | 40.4 | $La_2O_3$ | 1.0 | $Y_2O_3$ | 2.9 | |
| 6 | 42.8 | 9.1 | 45.9 | $La_2O_3$ | 1.1 | $Yb_2O_3$ | 1.1 | |
| 7 | 42.8 | 9.1 | 45.9 | $La_2O_3$ | 1.1 | $Nd_2O_3$ | 0.8 | $Gd_2O_3$ | 0.3 |
| 8 | 42.8 | 9.1 | 45.9 | $La_2O_3$ | 1.1 | $Dy_2O_3$ | 1.1 | |

TABLE 1-continued

| Test | Composition (mol %) | | | | | | | | |
|---|---|---|---|---|---|---|---|---|---|
| 9  | 42.8 | 9.1  | 45.9 | La$_2$O$_3$  | 1.1 | Sm$_2$O$_3$ | 0.6 | Eu$_2$O$_3$ | 0.5 |
| 10 | 42.8 | 9.1  | 45.9 | La$_2$O$_3$  | 1.1 | Lu$_2$O$_3$ | 0.6 | Er$_2$O$_3$ | 0.5 |
| 11 | 42.9 | 8.4  | 46.5 | La$_2$O$_3$  | 2.0 | Y$_2$O$_3$  | 0.5 | | |
| 12 | 50.0 | 13.0 | 34.4 | La$_2$O$_3$  | 0.9 | Y$_2$O$_3$  | 1.7 | | |
| 13 | 43.8 | 12.4 | 40.7 | La$_2$O$_3$  | 2.7 | Y$_2$O$_3$  | 0.4 | | |
| 14 | 44.6 | 12.7 | 41.5 | La$_2$O$_3$  | 0.6 | Y$_2$O$_3$  | 0.6 | | |
| 15 | 58.5 | 9.3  | 30.3 | La$_2$O$_3$  | 1.0 | Y$_2$O$_3$  | 1.0 | | |
| 16 | 52.0 | 11.0 | 35.5 | La$_2$O$_3$  | 0.6 | Y$_2$O$_3$  | 0.9 | | |
| 17 | 42.8 | 9.1  | 45.9 | La$_2$O$_3$  | 1.1 | Er$_2$O$_3$ | 1.1 | | |
| 18 | 27.3 | 10.9 | 59.8 | La$_2$O$_3$  | 2.1 | | | | |
| 19 | 22.1 | 12.7 | 63.3 | La$_2$O$_3$  | 1.9 | | | | |
| 20 | 57.0 | 16.4 | 24.1 | Y$_2$O$_3$   | 2.5 | | | | |
| 21 | 44.0 | 12.5 | 40.9 | Y$_2$O$_3$   | 2.6 | | | | |
| 22 | 72.8 | 6.2  | 18.4 | Yb$_2$O$_3$  | 2.6 | | | | |
| 23 | 43.3 | 12.3 | 40.2 | La$_2$O$_3$  | 2.5 | Y$_2$O$_3$  | 1.7 | | |
| 24 | 27.9 | 11.1 | 61.0 | La$_2$O$_3$  | 0.3 | Y$_2$O$_3$  | 0.3 | | |
| 25 | 80.8 | 1.6  | 14.1 | Y$_2$O$_3$   | 3.4 | | | | |
| 26 | 57.0 | 16.1 | 24.4 | Y$_2$O$_3$   | 2.5 | | | | |
| 27 | 42.8 | 9.1  | 46.0 | La$_2$O$_3$  | 2.0 | Y$_2$O$_3$  | 0.1 | | |
| 28 | 42.3 | 9.0  | 45.4 | La$_2$O$_3$  | 0.7 | Y$_2$O$_3$  | 2.6 | | |

(Analysis of Cutting Insert)

The analysis results of the obtained sialon sintered bodies are shown in Table 2.

The types of sialons to be contained in the sialon sintered bodies were identified by X-ray diffraction analysis of the obtained sialon sintered bodies.

When the sialon sintered bodies were observed using a scanning electron microscope, an amorphous grain boundary phase in which a crystal is partially included between the crystal grains was observed in all the sialon sintered bodies.

Each of the obtained sialon sintered body was subjected to X-ray diffraction analysis and the z value of the β-sialon was obtained by the above-mentioned Equation (1).

The solid solution ratio of Al in the β-sialon was obtained by subjecting the obtained sialon sintered body to X-ray fluorescence analysis to obtain the theoretical Z value by using the Equation (2) as described above, and substituting the obtained Z value and the theoretical Z value into "Z value/theoretical Z value×100".

The content of polytype sialon was obtained by subjecting the obtained sialon sintered body to X-ray diffraction analysis, and calculating the proportion [$(I_P/I_A) \times 100$] of the total $I_P$ of the peak intensities of each polytype sialon to the total $I_A$ of the peak intensities of each sialon as described above.

The content of the α-sialon was obtained by calculating the proportion [$(I_\alpha/I_A) \times 100$] of the peak intensity $I_\alpha$ of the α-sialon to the total $I_A$ of the peak intensities of each sialon in the same manner as the content of the polytype sialons was obtained.

The content of the rare earth element B and the rare earth element C to be included in each of the obtained sialon sintered body was obtained by X-ray fluorescence analysis.

The content of the rare earth element B and the rare earth element C to be included in the α-sialon was obtained by calculating an average value of values obtained by subjecting five or more the α-sialon grains to EDS analysis using a transmission electron microscope.

(Evaluation of Cutting Performance of Cutting Insert)

Cutting was performed by using the obtained cutting insert under the following cutting conditions. In the cutting, a cutting distance when any one of the following conditions is satisfied is shown in Table 2. Chipping and flaking are different from a phenomenon of damage appearing in the cutting insert, but are phenomena caused by the properties of the cutting insert such as strength and toughness.

(1) When VB wear (VB) becomes greater than 0.5 mm
(2) When side flank surface boundary wear (VN) becomes greater than 1.0 mm
(3) When chipping (B) occurs
(4) When flaking (F) occurs

[Cutting Conditions 1]
  Workpiece: Inconel 718
  Cutting Speed: 250 m/min
  Feed Speed: 0.2 mm/rev
  Depth of Cut 1.2 mm
  Cutting Oil: Used

[Cutting Conditions 2]
  Workpiece: Waspaloy
  Cutting Speed: 200 m/min
  Feed Speed: 0.2 mm/rev
  Depth of Cut 0.8 mm
  Cutting Oil: Used

TABLE 2

| | β-sialon | | | | Rare earth element | | | | α-sialon | | | Test result | | | |
| | | | | | In terms of an oxide | | | | Rare earth element | | | Cutting condition 1 | | Cutting condition 2 | |
| Test No. | Z value | Solid-solution ratio of Al (%) | Polytype sialon Content (%) | Type | $M_B$ (mol %) | $M_C$ (mol %) | $M_B + M_C$ (mol %) | $M_B:M_C$ molar ratio | $A_B:A_C$ atomic ratio | Content (%) | $A_B:A_C$ atomic ratio | $A_\alpha/A_S$ (%) | Cutting distance (km) | Life factor | Cutting distance (km) | Life factor |
|---|---|---|---|---|---|---|---|---|---|---|---|---|---|---|---|---|
| 1 | 0.6 | 30 | 29 | 21R | 1.1 | 1.1 | 2.2 | 1:1 | 1:2 | 0 | — | — | 1.5 | B | 1.0 | VN |
| 2 | 0.8 | 40 | 22 | 12H | 1.3 | 1.3 | 2.6 | 1:1 | 1:1 | 0 | — | — | 2.0 | F | 1.2 | VN |

TABLE 2-continued

| | β-sialon | | | | Rare earth element | | | | α-sialon Rare earth element | | | Test result Cutting condition 1 | | Cutting condition 2 | |
| | | Solid-solution | Polytype sialon | | In terms of an oxide | | | | | | | Cutting | | Cutting | |
| Test No. | Z value | ratio of Al (%) | Content (%) | Type | $M_B$ (mol %) | $M_C$ (mol %) | $M_B + M_C$ (mol %) | $M_B:M_C$ molar ratio | $A_B:A_C$ atomic ratio | Content (%) | $A_B:A_C$ atomic ratio | $A_\alpha/A_S$ (%) | distance (km) | Life factor | distance (km) | Life factor |
|---|---|---|---|---|---|---|---|---|---|---|---|---|---|---|---|---|
| 3 | 0.7 | 35 | 28 | 12H | 0.45 | 0.45 | 0.9 | 1:1 | 1:1 | 0 | — | — | 1.6 | F | 1.0 | VN |
| 4 | 1.0 | 50 | 20 | 12H | 1.3 | 1..3 | 2.6 | 1:1 | 1:1.3 | 0 | — | — | 1.5 | B | 0.9 | F |
| 5 | 0.7 | 35 | 21 | 12H | 1.0 | 2.9 | 3.9 | 1:2.9 | 1:2.9 | 0 | — | — | 1.5 | VB | 0.8 | VN |
| 6 | 0.9 | 45 | 19 | 12H | 1.1 | 1.1 | 2.2 | 1:1 | 1:1 | 7 | 0.4:1 | 40 | 1.4 | B | 0.7 | VN |
| 7 | 0.8 | 40 | 24 | 12H, 15R | 1.1 | 1.1 | 2.2 | 1:1 | 1:1 | 0 | — | — | 1.5 | F | 1.0 | VN |
| 8 | 0.8 | 40 | 23 | 12H, 21R | 1.1 | 1.1 | 2.2 | 1:1 | 1:1 | 0 | — | — | 1.4 | F | 1.0 | VN |
| 9 | 0.9 | 45 | 20 | 12H, 21R | 1.1 | 1.1 | 2.2 | 1:1 | 1:1 | 0 | — | — | 1.7 | F | 1.0 | VN |
| 10 | 0.7 | 35 | 20 | 12H | 1.1 | 1.1 | 2.2 | 1:1 | 1:1 | 9 | 0.7:1 | 70 | 1.5 | VN | 1.0 | VN |
| 11 | 0.55 | 28 | 30 | 12H | 2.0 | 0.5 | 2.5 | 1:0.25 | 1:0.25 | 0 | — | — | 1.4 | VB | 1.1 | B |
| 12 | 1.0 | 50 | 12 | 12H | 0.9 | 1.7 | 2.6 | 1:1.9 | 1:1.9 | 5 | 0.2:1 | 38 | 1.4 | VB | 0.9 | VN |
| 13 | 0.9 | 45 | 15 | 12H | 2.7 | 0.4 | 3.1 | 1:0.15 | 1:0.15 | 0 | — | — | 1.5 | VN | 1.0 | VN |
| 14 | 0.8 | 40 | 18 | 15R | 0.6 | 0.6 | 1.2 | 1:1 | 1:1 | 0 | — | — | 1.5 | B | 0.9 | F |
| 15 | 0.5 | 25 | 11 | 12H | 1.0 | 1.0 | 2.0 | 1:1 | 1:1 | 2 | 0.3:1 | 30 | 1.4 | VB | 0.8 | VN |
| 16 | 0.7 | 35 | 20 | 12H | 0.6 | 0.9 | 1.5 | 1:1.5 | 1:1.5 | 0 | — | — | 2.1 | VB | 1.4 | VN |
| 17 | 0.7 | 35 | 20 | 12H | 1.1 | 1.1 | 2.2 | 1:1 | 1:1 | 8 | 0.8:1 | 80 | 1.4 | VN | 0.8 | VN |
| 18 | 0.7 | 35 | 59 | 21R | 2.1 | 0 | 2.1 | 1:0 | 1:0 | 0 | — | — | 0.8 | B | 0.5 | VN |
| 19 | 1.0 | 50 | 70 | 12H | 1.9 | 0 | 1.9 | 1:0 | 1:0 | 0 | — | — | 0.5 | B | 0.3 | B |
| 20 | 1.3 | 65 | 7 | 12H | 0 | 2.5 | 2.5 | 0:1 | 0:1 | 0 | — | — | 1.0 | VB | 0.5 | F |
| 21 | 1.2 | 60 | 16 | 12H | 0 | 2.6 | 2.6 | 0:1 | 0:1 | 8 | 0:1 | — | 1.0 | F | 0.5 | VN |
| 22 | 0.6 | 30 | 0 | — | 0 | 2.6 | 2.6 | 0:1 | 0:1 | 17 | 0:1 | — | 1.0 | VB | 0.5 | VB |
| 23 | 0.9 | 45 | 20 | 12H | 2.5 | 1.7 | 4.2 | 1:0.7 | 1:0.7 | 0 | — | — | 0.8 | VN | 0.5 | VN |
| 24 | 1.4 | 70 | 10 | 12H | 0.3 | 0.3 | 0.6 | 1:1 | 1:1 | 0 | — | — | Not able to be densified | | | |
| 25 | 0.3 | 15 | 0 | — | 0 | 3.4 | 3.4 | 0:1 | 0:1 | 15 | 0:1 | — | 0.5 | VB | 0.4 | VB |
| 26 | 0.9 | 45 | 15 | 12H | 0 | 2.5 | 2.5 | 0:1 | 0:1 | — | — | — | 1.1 | VN | 0.5 | B |
| 27 | 0.8 | 40 | 18 | 12H | 2 | 0.1 | 2.1 | 1:0.05 | 1:0.05 | — | — | — | 1.1 | VN | 0.4 | F |
| 28 | 1.0 | 50 | 9 | 12H | 0.7 | 2.6 | 3.3 | 1:3.7 | 1:3.7 | 13 | 0.1:1 | 37 | 4.0 | VN | 3.5 | VN |

As shown in Table 2, it is found that the cutting inserts within the range of the present invention have a long cutting distance until any one of the conditions of VB wear, side flank surface boundary wear, chipping, and flaking is satisfied during the cutting, and have VB wear resistance, boundary wear resistance, and breakage resistance. Accordingly, the cutting inserts within the range of the present invention can be used in both the roughing and semi-finishing using a heat resistant alloy such as Inconel 718 and Waspaloy as a workpiece. On the other hand, it is found that, compared to the cutting inserts within the range of the present invention, the cutting inserts out of the range of the present invention have a short cutting distance until any one of the conditions of VB wear, side flank surface boundary wear, chipping, and flaking is satisfied during the cutting, and at least one of VB wear resistance, boundary wear resistance, and breakage resistance is deteriorated.

Hereinafter, the test results of Table 2 will be described in detail.

The cutting insert of Test No. 25 in which the Z value of the β-sialon is less than 0.4 has a short cutting distance compared to the cutting inserts within the range of the present invention. In the cutting insert of Test No. 25, the life factor is VB wear, and thus, when the Z value of the β-sialon is less than 0.4, it is found that VB wear resistance tends to deteriorate.

The cutting inserts of Test Nos. 20 and 21 in which the Z value of the β-sialon is greater than 1.0 have a short cutting distance compared to the cutting inserts within the range of the present invention. In addition, flaking is included as a life factor in both the cutting inserts of Test Nos. 20 and 21. Accordingly, when the Z value of the β-sialon is greater than 1.0, it is found that flaking is likely to occur and breakage resistance tends to deteriorate.

It is found that the polytype sialon is hardly formed in the cutting inserts of Test Nos. 20 to 22, 25, and 26, in which the rare earth element B is not contained.

The cutting inserts of Test Nos. 20, 22, 25, and 28, in which the content of the polytype sialon, is less than 10% have a short cutting distance compared to the cutting inserts within the range of the present invention. Since the rare earth element B is not contained in the cutting inserts of Test Nos. 20 to 22, 25, and 26, the polytype sialon is hardly formed. In addition, in the cutting inserts of Test Nos. 22 and 25 in which the polytype sialon is not contained, the life factor is VB wear, and thus, when the content of the polytype sialon is less than 10%, it is found that VB wear resistance tends to deteriorate.

The cutting inserts of Test Nos. 18 and 19 in which the content of the polytype sialon is greater than 50% have a short cutting distance compared to the cutting inserts within the range of the present invention. In addition, in the cutting inserts of Test Nos. 18 and 19, the life factor is chipping in many cases, and thus, when the content of the polytype sialon is greater than 50%, it is found that breakage resistance tends to deteriorate.

In the cutting insert of Test No. 24 in which the total of the content of the rare earth element B and the content of the rare earth element C is less than 0.8 mol %, it is found that sinterability is deteriorated and thus a dense sialon sintered body cannot be obtained.

The cutting insert of Test No. 23, in which the total of the content of the rare earth element B and the content of the rare earth element C is greater than 4.0 mol %, has a short cutting distance compared to the cutting inserts within the range of the present invention. In addition, in the cutting insert of Test No. 23, the life factor is side flank surface boundary wear, and thus, when the total of the content of the rare earth element B and the content of the rare earth element C is greater than 4.0 mol %, it is found that boundary wear resistance tends to deteriorate.

The cutting insert of Test No. 27, in which the rare earth element B and the rare earth element C are included and the molar ratio $M_C/M_B$ is less than 0.06, has a short cutting distance compared to the cutting inserts within the range of the present invention. In addition, in the cutting insert of Test No. 27, flaking is included in the life factor, and thus, when the molar ratio $M_C/M_B$ is less than 0.06, it is found that breakage resistance tends to deteriorate.

The cutting insert of Test No. 28, in which the rare earth element B and the rare earth element C are included and the molar ratio $M_C/M_B$ is greater than 3.5, has a short cutting distance compared to the cutting inserts within the range of the present invention. In the cutting insert of Test No. 28, the life factor is side flank surface boundary wear, and thus, it is found that the boundary wear resistance of the cutting insert of Test No. 28 tends to deteriorate. Since the rare earth element B is contained in the cutting insert of Test No. 28, it is considered that β-sialon is likely to be formed in a needle shape and the breakage resistance is improved compared to the cutting inserts of Test Nos. 20 to 22, 25, and 26 in which the rare earth element B is not contained.

REFERENCE SIGNS LIST

1 Cutting insert
10 Cutting tool
11 Main body
12 Mounting portion

The invention claimed is:

1. A sialon sintered body comprising:

a β-sialon; and at least one polytype sialon selected from a group consisting of a 12H-sialon, a 15R-sialon, and a 21R-sialon, characterized in that:

a Z value of the β-sialon expressed by $Si_{6-Z}Al_ZO_ZN_{8-Z}$ is 0.4 or greater and 1.0 or less, a proportion [$(I_P/I_A) \times 100$] of a total $I_P$ of peak intensities of each polytype sialon calculated from the peak intensities of the polytype sialons to a total $I_A$ of peak intensities of each sialon calculated from the peak intensities of the sialons, which is obtained by X-ray diffraction analysis, is 10% or greater and 50% or less, the sialon sintered body includes at least one rare earth element B selected from a group consisting of La and Ce, and at least one rare earth element C selected from a group consisting of Y, Nd, Sm, Eu, Gd, Dy, Er, Yb, and Lu, a molar ratio $M_B:M_C$ of the rare earth element B and the rare earth element C is 1.0:0.06 to 1.0:3.5 in terms of an oxide, and a total content of the rare earth element B and the rare earth element C in the sialon sintered body is 0.8 mol % or greater and 4.0 mol % or less in terms of an oxide.

2. The sialon sintered body according to claim 1, characterized in that:

when the Z value calculated from a composition of the sialon sintered body is set to a theoretical Z value on the assumption that an amount of Al included in the β-sialon is the same as the amount of Al included in the sialon sintered body, a solid solution ratio of Al in the β-sialon, which is expressed by a proportion [(Z value/theoretical Z value)×100] of the Z value to the theoretical Z value, is 30% or greater and 60% or less.

3. The sialon sintered body according claim 1, characterized in that:

the sialon sintered body does not include an α-sialon.

4. The sialon sintered body according to claim 1, characterized in that:

a proportion [$(I_\alpha/I_A) \times 100$] of a peak intensity $I_\alpha$ of an α-sialon to the total $I_A$ of the peak intensities of each sialon, which is obtained by X-ray diffraction analysis, is less than 10%, in the α-sialon expressed by $M_x(Si,Al)_{12}(O,N)_{16}$ ($0 < x \le 2$), M is a metal element including the rare earth element B and the rare earth element C, and a proportion [$(A_\alpha/A_S) \times 100$] of an atomic ratio $A_\alpha$ of the rare earth element B to the rare earth element C in the α-sialon to an atomic ratio $A_S$ of the rare earth element B to the rare earth element C in the sialon sintered body is 70% or less.

5. A cutting insert comprising:

the sialon sintered body according to claim 1.

* * * * *